(12) United States Patent
Asanuma et al.

(10) Patent No.: US 9,274,740 B2
(45) Date of Patent: Mar. 1, 2016

(54) LIQUID CRYSTAL DISPLAY APPARATUS ENABLING A USER TO RECOGNIZE POSITIONS AND BOUNDARIES OF LIGHT SOURCE BLOCKS, METHOD FOR CONTROLLING THE SAME, AND IMAGE DISPLAY SYSTEM

(75) Inventors: Tomoya Asanuma, Kawasaki (JP); Satoshi Hanamitsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 13/452,107

(22) Filed: Apr. 20, 2012

(65) Prior Publication Data

US 2012/0274659 A1 Nov. 1, 2012

(30) Foreign Application Priority Data

Apr. 28, 2011 (JP) .................... 2011-101488

(51) Int. Cl.
  *G09G 3/36* (2006.01)
  *G06F 3/14* (2006.01)
  *G09G 3/34* (2006.01)
(52) U.S. Cl.
  CPC ............ *G06F 3/1415* (2013.01); *G09G 3/3426* (2013.01); *G09G 3/3611* (2013.01); *G09G 2320/0646* (2013.01); *G09G 2340/12* (2013.01); *G09G 2354/00* (2013.01)

(58) Field of Classification Search
  CPC . G06F 3/1415; G09G 3/3611; G09G 2340/12
  See application file for complete search history.

(56) References Cited

U.S. PATENT DOCUMENTS

| 2010/0231610 A1* | 9/2010 | Hoffman et al. ............... 345/660 |
| 2010/0309120 A1* | 12/2010 | Kim et al. ..................... 345/157 |
| 2011/0115828 A1* | 5/2011 | Seo et al. ...................... 345/690 |

FOREIGN PATENT DOCUMENTS

| JP | 2008-164863 | 7/2008 |
| WO | WO2009157221 | * 12/2009 |

* cited by examiner

*Primary Examiner* — Michelle Sams
(74) *Attorney, Agent, or Firm* — Cowan, Liebowitz & Latman, P.C.

(57) ABSTRACT

A liquid crystal display apparatus which enables a user to recognize positions and boundaries of light source blocks, a method for controlling the same, and an image display system are provided. The apparatus comprises a liquid crystal panel; a backlight which has a plurality of light source blocks and which radiates light onto the liquid crystal panel; a generating unit which generates boundary image data which indicates a light source block area as an area corresponding to each of the light source blocks on the liquid crystal panel; a combining unit which combines image data to be inputted and the boundary image data; and a display control unit which displays composite image data combined by the combining unit on the liquid crystal panel.

22 Claims, 12 Drawing Sheets

SPECIFIED AREA 1901
DESIGNATED BY USER

BOUNDARY IMAGE 1902
CORRESPONDING TO SPECIFIED AREA
DESIGNATED BY USER

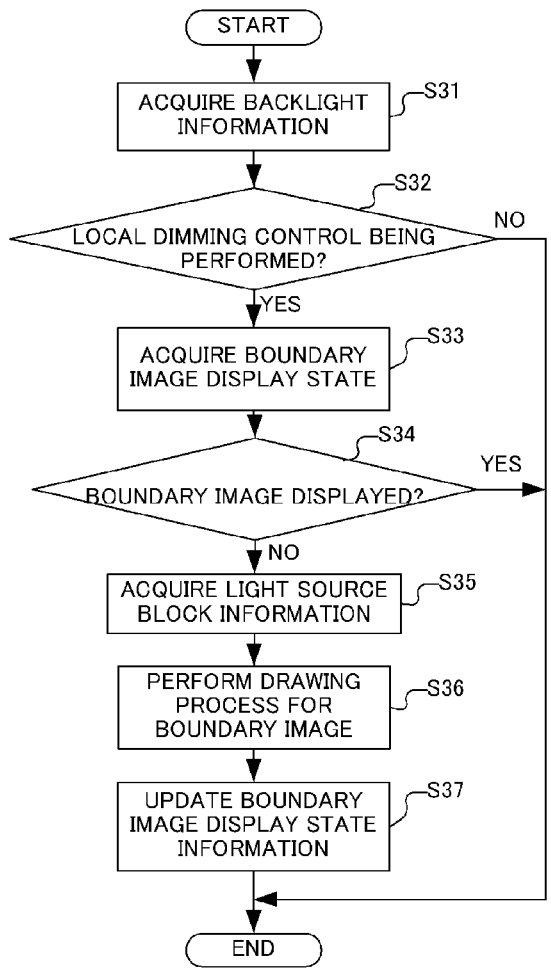
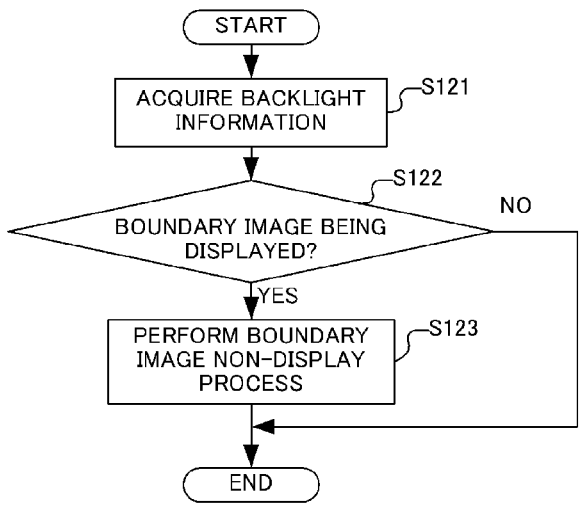
Fig.3A
Fig.3B

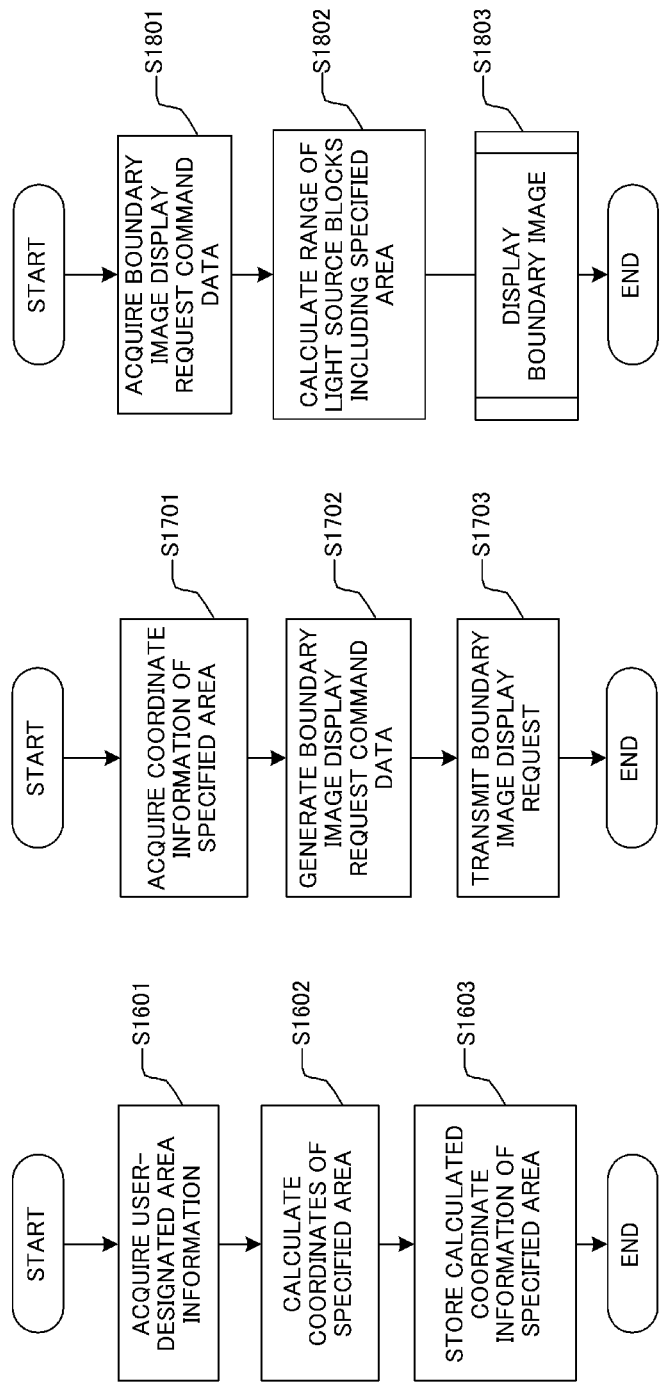

LIQUID CRYSTAL DISPLAY APPARATUS ENABLING A USER TO RECOGNIZE POSITIONS AND BOUNDARIES OF LIGHT SOURCE BLOCKS, METHOD FOR CONTROLLING THE SAME, AND IMAGE DISPLAY SYSTEM

BACKGROUND OF THE INVENTION

1. Field of the Invention

The present invention relates to a liquid crystal display apparatus, a method for controlling the same, and an image display system.

2. Description of the Related Art

In recent years, LED (Light Emitting Diode) is progressively adopted as the backlight light source for the liquid crystal panel. The backlight, in which LED is used, includes the direct type LED backlight provided with LED arranged on the back surface of the liquid crystal panel. The direct type LED backlight has such a feature that the light emission luminance of the backlight can be changed locally. The backlight control system, which makes use of such a feature, includes a technique called "local dimming" in which the light emission luminance of the backlight is controlled for each of light source blocks depending on an input image signal. In the local dimming, the light emission luminance of the backlight is adjusted for each of the light source blocks, and hence it is possible to expect the effect to improve the contrast as compared with a case in which the light emission luminance of the entire surface of the backlight is adjusted.

A technique described in Japanese Patent Application Laid-open No. 2008-164863 is known as a conventional technique in relation to the local dimming as described above. In this conventional technique, a light source, which is divided into a plurality of light source blocks to be controlled, is provided, and the respective luminance values of the plurality of light source blocks of the light source are calculated from input image data corresponding to the plurality of light source blocks. The conventional technique discloses a transmission type display apparatus based on the use of a backlight in which the lighting of the light source is controlled on the basis of the calculation result.

On the other hand, the realization of high resolution of the display is advanced. It is predicted that a user, who photographs still images, may display the still image as the product or work of the user himself/herself on a high resolution display, and the user may utilize the high resolution display as a field of expression in future. In such a situation, it is necessary for the user to perform the image quality adjustment for the product or work (still image) of the user himself/herself in combination with a specified display. Further, in the case of a display in which the local dimming control is performed, it is necessary to perform the image editing (for example, change of layout, trimming, enlargement, and contraction) while considering the effect to improve the contrast to be brought about by the local dimming.

SUMMARY OF THE INVENTION

In the local dimming control, the luminance of the backlight is adjusted in relation to the light source block units. When an area, in which it is intended to improve the contrast of an image to be displayed on the liquid crystal display apparatus, exists while ranging over different light source blocks, if the image editing is performed without considering the positional relationship with respect to the light source blocks, then the effect to improve the contrast is not obtained sufficiently by the local dimming control in some cases.

Therefore, when the image, which is to be displayed on the liquid crystal display apparatus to perform the local dimming control, is edited, it is desired that the image editing is performed while being conscious of the positions and the boundaries of the light source blocks of the backlight of the liquid crystal display apparatus. However, conventionally, the user cannot recognize the positions and the boundaries of the light source blocks. Therefore, a problem arises such that trial and error are required in order to perform the image editing while considering the effect to improve the contrast by means of the local dimming control.

In view of the above, the present invention provides a liquid crystal display apparatus which enables a user to recognize positions and boundaries of light source blocks, a method for controlling the same, and an image display system.

A first aspect of the present invention resides in a liquid crystal display apparatus comprising a liquid crystal panel; a backlight which has a plurality of light source blocks and which radiates light onto the liquid crystal panel; a generating unit which generates boundary image data which indicates a light source block area as an area corresponding to each of the light source blocks on the liquid crystal panel; a combining unit which combines image data to be inputted and the boundary image data; and a display control unit which displays composite image data combined by the combining unit on the liquid crystal panel.

A second aspect of the present invention resides in a method for controlling a liquid crystal display apparatus comprising a liquid crystal panel and a backlight which has a plurality of light source blocks and which radiates light onto the liquid crystal panel; the method comprising a generating step of generating boundary image data which indicates a light source block area as an area corresponding to each of the light source blocks on the liquid crystal panel; a combining step of combining image data to be inputted and the boundary image data; and a display step of displaying composite image data combined in the combining step on the liquid crystal panel.

According to the present invention, the liquid crystal display apparatus which enables a user to recognize positions and boundaries of light source blocks, the method for controlling the same, and the image display system are provided.

Further features of the present invention will become apparent from the following description of exemplary embodiments with reference to the attached drawings.

BRIEF DESCRIPTION OF THE DRAWINGS

FIG. 3 shows flow charts illustrating a display process and a display clear process for a boundary image in the first embodiment.

FIG. 10 shows flow charts illustrating a display process for a specified area in the third embodiment.

DESCRIPTION OF THE EMBODIMENTS

An explanation will be made below with reference to the drawings and the flow charts about embodiments for carrying out this invention. However, the present invention is not limited to the following embodiments.

Figure 2:
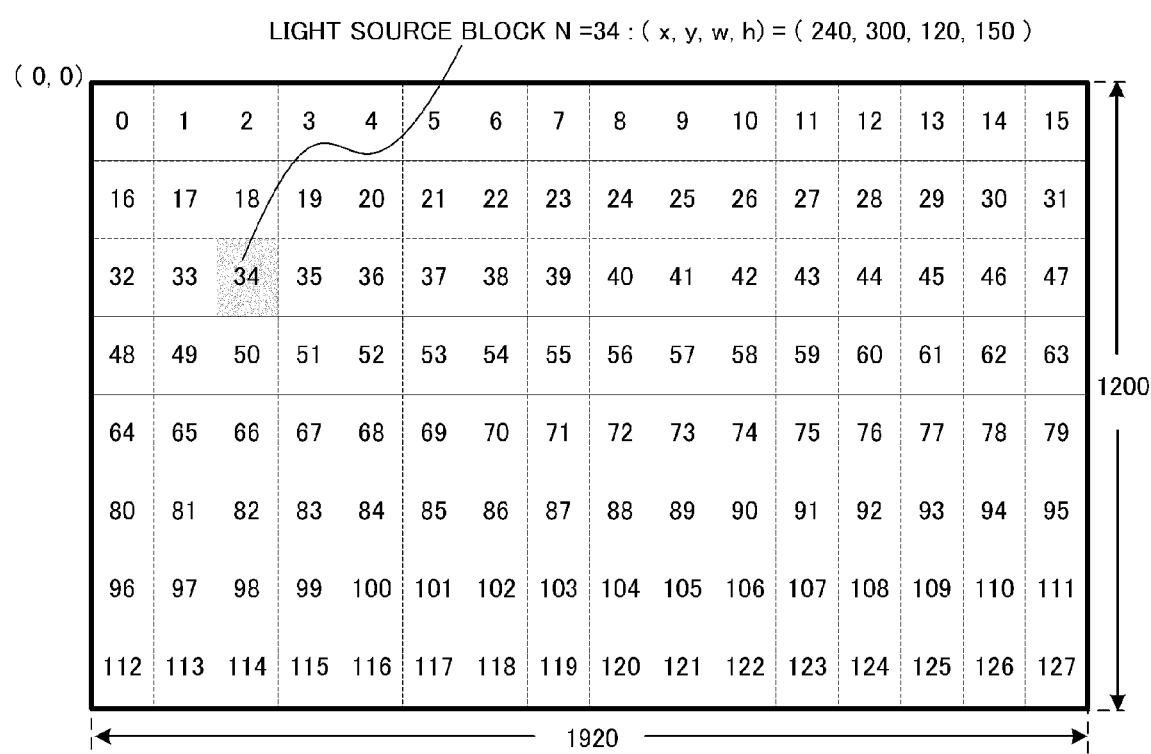
FIG. 2 illustrates light source blocks in the first embodiment.

In the present invention, the light emission of a backlight is controlled by means of the local dimming control for controlling the light emission luminance of the backlight for each of a plurality of light source blocks. As shown in FIG. 2, the backlight is divided into 128 light source blocks in total wherein the backlight is divided into eight in the vertical direction and the backlight is divided into sixteen in the lateral direction. The light emission luminance can be adjusted for each of the light source blocks (N=0 to 127). The number of the light source blocks of the backlight is provided by way of example, and there is no limitation thereto.

First Embodiment

Figure 1:
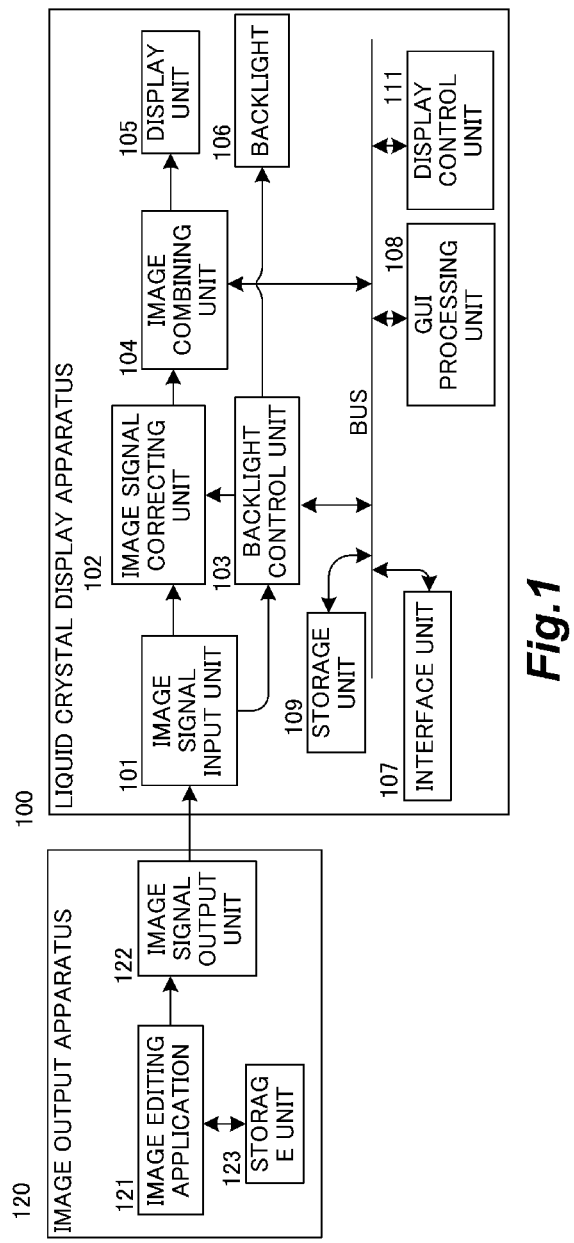
FIG. 1 shows a block diagram illustrating a system configuration in a first embodiment.

An explanation will be made with reference to FIG. 1 about the structure or configuration of a liquid crystal display apparatus 100 according to a first embodiment of the present invention. The first embodiment resides in an exemplary case of the liquid crystal display apparatus for displaying a boundary image in accordance with an instruction of a user. The boundary image is an image which is based on the boundary image data for displaying the area corresponding to the light source blocks on a liquid crystal panel. Details are described later on.

In a liquid crystal display apparatus 100, a image signal is inputted from a image output apparatus 120, and the inputted image signal is displayed on a display unit 105 which is a liquid crystal panel.

Further, the liquid crystal display apparatus 100 controls the light emission luminance of the backlight 106 for each of the light source blocks on the basis of the image signal inputted from the image output apparatus 120.

The image output apparatus 120 performs the image output, for example, such that the image signal of an image subjected to the image editing by an image editing application 121 is outputted via a image signal output unit 122. In this case, the image data, which is subjected to the image editing by the image editing application 121, is acquired, for example, from a storage unit 123 included in the image output apparatus 120, and the image data is stored and memorized in the storage unit 123 as well when the image data is updated.

The image signal is inputted into an image signal input unit 101 from the image output apparatus 120. The image signal input unit 101 sends the inputted image signal to a backlight control unit 103 and a image signal correcting unit 102 as described later on.

The backlight control unit 103 controls the light emission luminance of the backlight for each of the light source blocks (N=0 to 127) shown in FIG. 2 on the basis of the image signal inputted from the image signal input unit 101.

The image signal correcting unit 102 performs a correcting process for the image signal so that the decrease in the luminance of the backlight is supplemented in accordance with the luminance value of the backlight determined by the backlight control unit 103.

An interface unit 107 receives a GUI control signal to request the operation of GUI from the user by means of a user interface such as buttons or the like equipped for a controller and the liquid crystal display apparatus 100. The interface unit 107 requests the operation and the generation of GUI with respect to a GUI processing unit 108 depending on the received control signal.

The GUI processing unit 108 generates GUI image data on the basis of the control signal received by the interface unit 107. In this case, for example, the material data required for the GUI image data is acquired from a storage unit 109 included in the liquid crystal display apparatus 100, and the data is stored and memorized in the storage unit 109 as well when the data is updated.

An image combining unit 104 combines or synthesizes the image signal which is corrected by the image signal correcting unit 102 and GUI which is generated by the GUI processing unit 108. The image signal, with which GUI is combined by the image combining unit 104, is sent to the display unit 105.

The display unit 105 is composed of the liquid crystal panel, which displays the image signal outputted from the image combining unit 104.

The backlight 106 is a module which has the plurality of light source blocks and which illuminates the liquid crystal panel of the display unit 105. LED is used as the light source. As for the backlight 106, the light emission luminance of the backlight is controlled for each of the light source blocks as shown in FIG. 2 on the basis of the luminance value determined by the backlight control unit 103.

An explanation will be made with reference to a flowchart shown in FIG. 3A and a drawing of an exemplary data structure of the backlight information shown in FIG. 4 in relation to the boundary image display process in the GUI processing unit 108.

Figure 4:
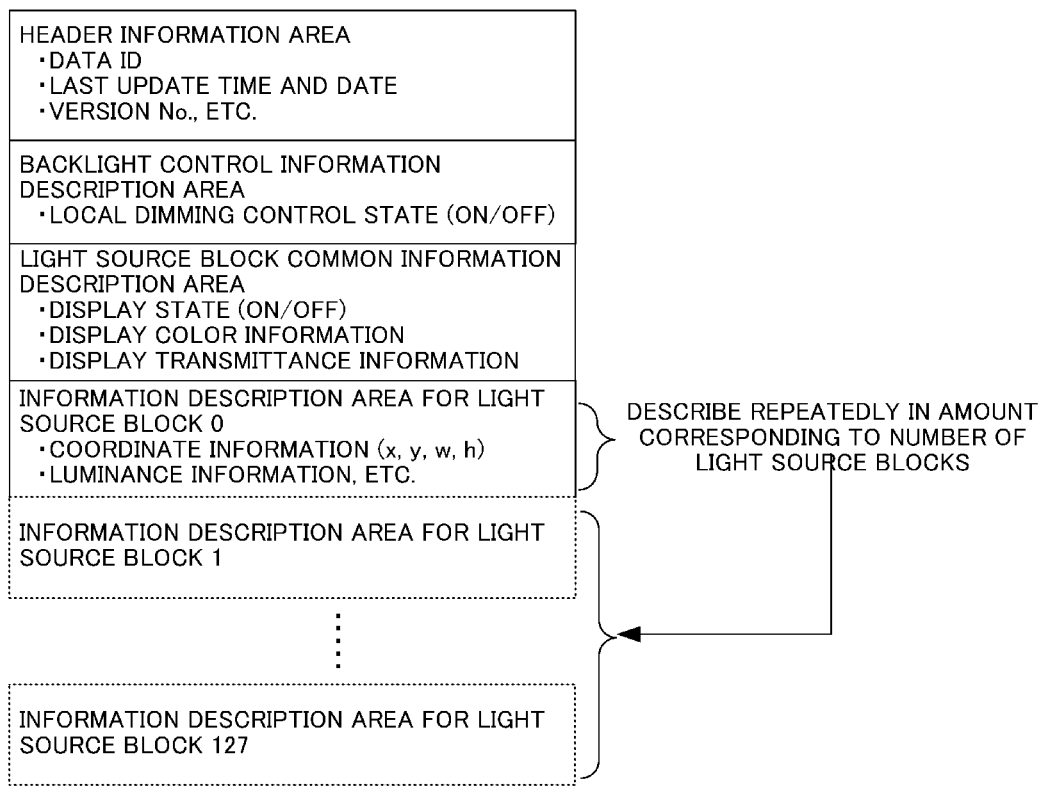
FIG. 4 shows an exemplary data structure of backlight information in the first embodiment.

In Step S31, the GUI processing unit 108 acquires the backlight information as shown in FIG. 4 from the backlight control unit 103. The backlight control unit 103 acquires the backlight information from the storage unit 109, and the information is outputted to the GUI processing unit 108. As shown in FIG. 4, the backlight information includes a header information area, a backlight control information description area, a light source block common information description area, and information description areas for individual light source blocks. For example, the data ID, the last update time and date, and the version information are described in the header information area. The local dimming control state (ON/OFF) is described in the backlight control information description area. For example, the display state of the boundary image (ON/OFF), the display color information, and the display transmittance information are described in the light source block common information description area. For example, the coordinate information and the luminance information of the light source block area as the area on the liquid crystal panel corresponding to each of the light source blocks of N=0 to 127 are described in the information description area for the individual light source block.

In Step S32, the GUI processing unit 108 makes reference to the local dimming control state described in the backlight control information description area of the backlight information acquired as described above to judge whether or not the local dimming control is being performed. As a result of the judgment, if the local dimming control is not being performed, i.e., if the backlight 106 is controlled in accordance with the ordinary control in which all of the light source blocks are allowed to perform the light emission at an identical luminance, then the GUI processing unit 108 completes the boundary image display process. If the local dimming control is being performed, the GUI processing unit 108 proceeds to Step S33.

In Step S33, the GUI processing unit 108 acquires the boundary image display state described in the information description area common to the light source block from the backlight information acquired as described above.

In Step S34, the GUI processing unit 108 judges whether or not the boundary image is displayed, from the boundary image display state acquired as described above. As a result of the judgment, if the boundary image has been already displayed, the GUI processing unit 108 completes the process of the flow chart shown in FIG. 3A. If the boundary image is not displayed, the GUI processing unit 108 proceeds to Step S35.

In Step S35, the GUI processing unit 108 acquires the coordinate information described in the information description area for the light source block (N=0 to 127) from the backlight information acquired as described above. In this case, the coordinate information of the light source block N is expressed by a combination of the coordinates (x, y) of the pixel disposed at the upper-left apex in the area on the liquid crystal panel corresponding to the light source block N and the number of pixels (w, h) in the lateral direction and the vertical direction. The coordinates (x, y) of the pixel on the liquid crystal panel are provided on the basis of the origin which is the upper-left apex of the liquid crystal panel. For example, the coordinate information of the light source block (N=34) resides in (x, y, w, h)=(240, 300, 120, 150).

In Step S36, the GUI processing unit 108 performs the drawing process for the boundary image on the basis of the coordinate information of the light source block (N=0 to 127) acquired as described above.

After the completion of Step S36, the GUI processing unit 108 transmits the boundary image display state information (ON) to the backlight control unit 103 in Step S37. The boundary image display state information (ON), which is transmitted from the GUI processing unit 108, is transmitted to the storage unit 109 by the backlight control unit 103, and the boundary image display state information is updated.

According to the process as described above, the display process for the boundary image is performed in the GUI processing unit 108.

An explanation will be made about a method for superimposing and displaying GUI on the input image by means of the image signal combining process for combining the image signal and GUI in the image combining unit 104.

The image signal, which is inputted from the image signal input unit 101, is written into an input image drawing memory via the image signal correcting unit 102.

On the other hand, the GUI processing unit 108 generates the GUI image data on the basis of the GUI control signal outputted from the interface unit 107 in accordance with the request of the user as described above, and the GUI image data is written into a GUI image drawing memory.

The image combining unit 104 combines the image data stored in the input image drawing memory and the GUI image data stored in the GUI image drawing memory, and the image data and the GUI data combined as described above are written into an image combining memory.

According to the procedure as described above, the process is performed to superimpose GUI on the input image in order to perform the display by means of the image signal combining process for the image signal and GUI.

Figure 5A:
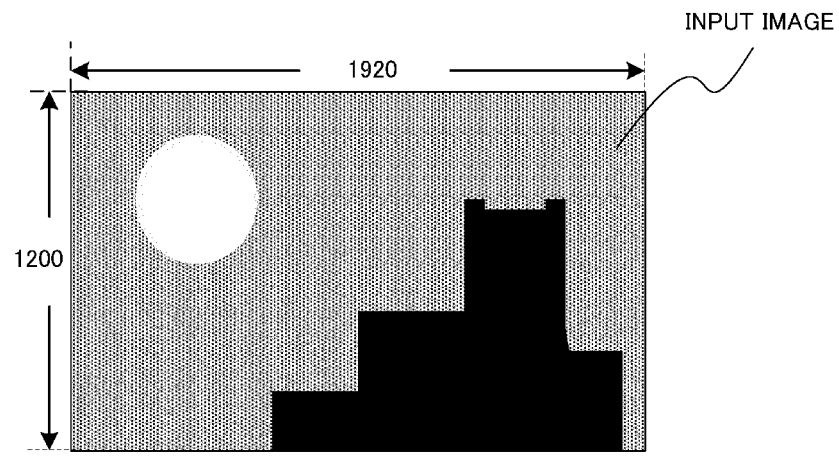
FIG. 5 illustrates a drawing method for drawing a boundary image in the first embodiment.
Figure 5B:
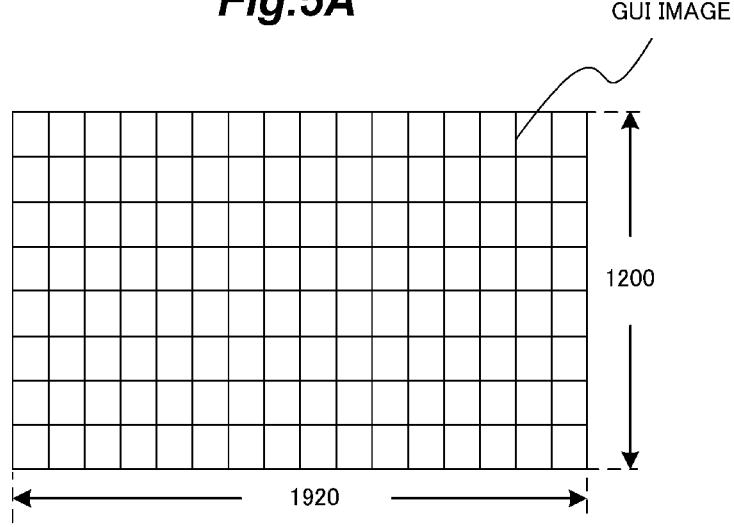

FIG. 5 exemplarily shows GUI image stored in the GUI image drawing memory and the input image stored in the input image drawing memory when the boundary image data is written into the GUI image drawing memory. In FIG. 5, lattice-shaped or grid-shaped GUI image, which is included in the GUI image drawing memory, represents the boundary image.

Figure 6:
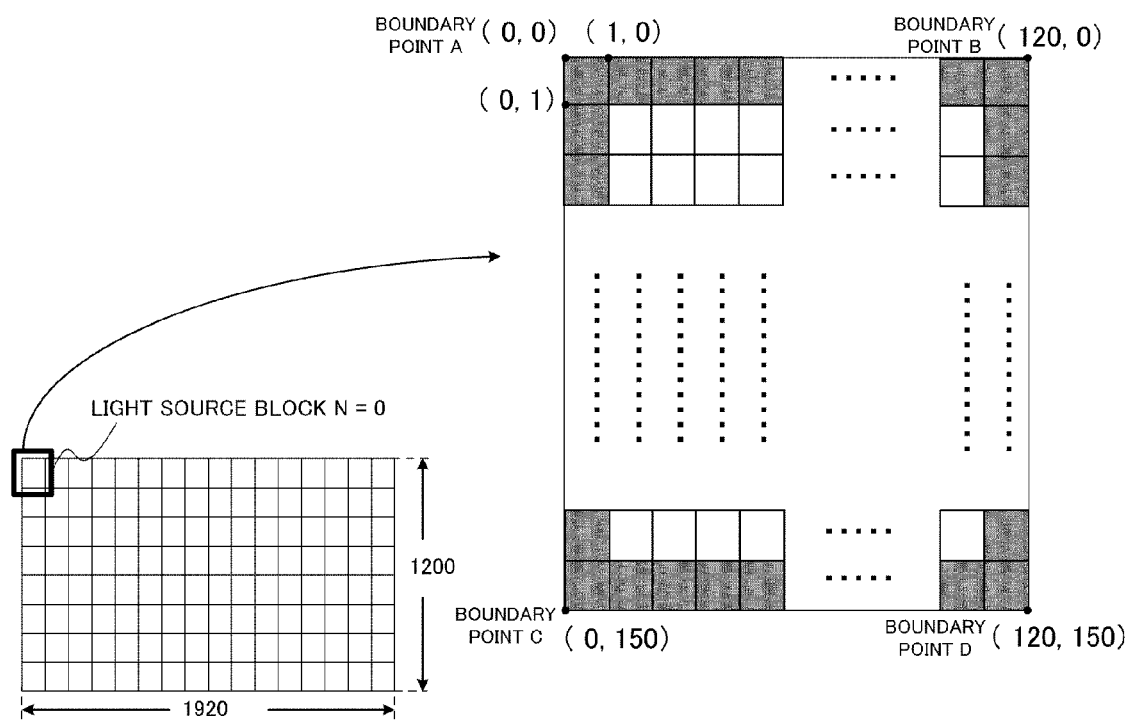
FIG. 6 shows an exemplary boundary image illustrating the light source block 0 in the first embodiment.

An explanation will be made about a method for drawing light source block display lines in the GUI processing unit 108. The light source block display line is a line-shaped GUI part image which indicates the boundary between the areas corresponding to the individual light source blocks for constructing the boundary image. FIG. 6 illustrates, for example, such a case that the light source block display lines, which represent the light source block (N=0), are drawn by 1 dot display lines.

The GUI processing unit 108 performs the light source block display line drawing process on the basis of the coordinate information x=0, y=0, w=120, h=150 of the light source block (N=0) acquired from the backlight control unit 103. The GUI processing unit 108 calculates the boundary points of the area corresponding to the light source block (N=0) on the basis of the coordinate information. In this case, the boundary points are specifically represented by Boundary point A (0, 0), Boundary point B (120, 0), Boundary point C (0, 150), and Boundary point D (120, 150). The GUI processing unit 108 draws the inside 1 dot portion of Boundary line AB, Boundary line AC, Boundary line BD, and Boundary line CD for connecting the boundary points calculated as described above, as the light source block display lines to represent the light source block (N=0) on the basis of the color information and the transmittance information of the light source block display lines as described later on.

The drawing as described above is performed for all of the light source blocks (N=0 to 127), and thus the light source block display lines are drawn for all of the light source blocks.

An explanation will be made about a method for setting, by the user, the color, the transmittance, and the line thickness of the light source block display lines in the GUI processing unit 108.

The GUI processing unit 108 generates and displays a light source block display line setting screen on the basis of the GUI control signal outputted from the interface unit 107 in accordance with a request of the user. The user can set the color of the light source block display line with the RGB value by operating GUI on the displayed light source block display line setting screen. Similarly, the user can also set the transmittance and the thickness of the light source block display line by means of the operation of GUI on the setting screen. The transmittance represents the transparency of the light source block display line with respect to the input image as the background image.

The method for setting the light source block display line explained herein is an example. Therefore, it is unnecessary to limit the procedure to the method described above as the realizing method.

An explanation will be made about a method for displaying the boundary image in the GUI processing unit 108.

The GUI processing unit 108 generates and displays a boundary image display ON/OFF setting screen on the basis of the GUI control signal outputted from the interface unit 107 in accordance with a request of the user. The user can set the display/non-display of the boundary image by operating GUI of the displayed boundary image display ON/OFF setting screen.

The method for setting the display/non-display of the boundary image by operating GUI of the boundary image display ON/OFF setting screen explained herein is an example. It is also possible to adopt any other setting method. For example, it is also allowable to adopt such a method that the display instruction is inputted for the boundary image to switch the display ON/OFF by operating a remote controller or buttons equipped for the liquid crystal display apparatus 100 by the user.

Figure 5C:
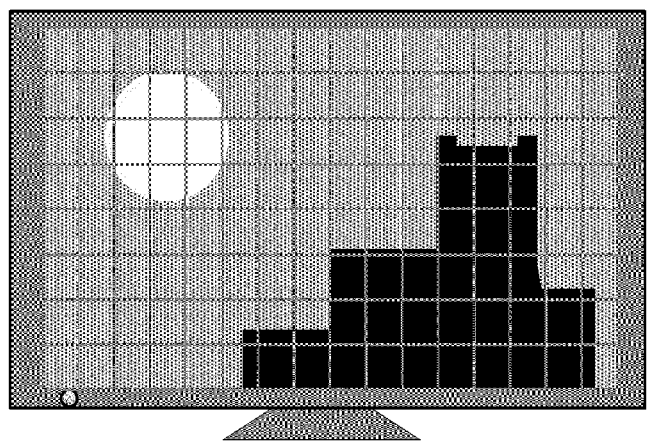

FIG. 5C shows an exemplary display state of the liquid crystal display apparatus 100 after executing the display process for the boundary image in accordance with the process as described above.

Finally, an explanation will be made with reference to a flow chart shown in FIG. 3B about a boundary image data display clear process wherein the boundary image, which has been displayed by the process as already described above, is allowed to be in a non-display state.

In Step S121, the GUI processing unit 108 acquires the backlight information as shown in FIG. 4 from the backlight control unit 103. The GUI processing unit 108 acquires the boundary image display state described in the information description area common to the light source block from the backlight information acquired as described above.

In Step S122, the GUI processing unit 108 judges whether or not the boundary image is displayed from the boundary image display state acquired as described above. As a result of the judgment, if the boundary image is not displayed, the GUI processing unit 108 completes the boundary image data display clear process. If the boundary image is displayed, the GUI processing unit 108 proceeds to Step S123.

In Step S123, the GUI processing unit 108 performs a process for clearing the boundary image drawn in the GUI image drawing memory.

According to the process as described above, the boundary image data display clear process is performed in the GUI processing unit 108.

Second Embodiment

Figure 7:
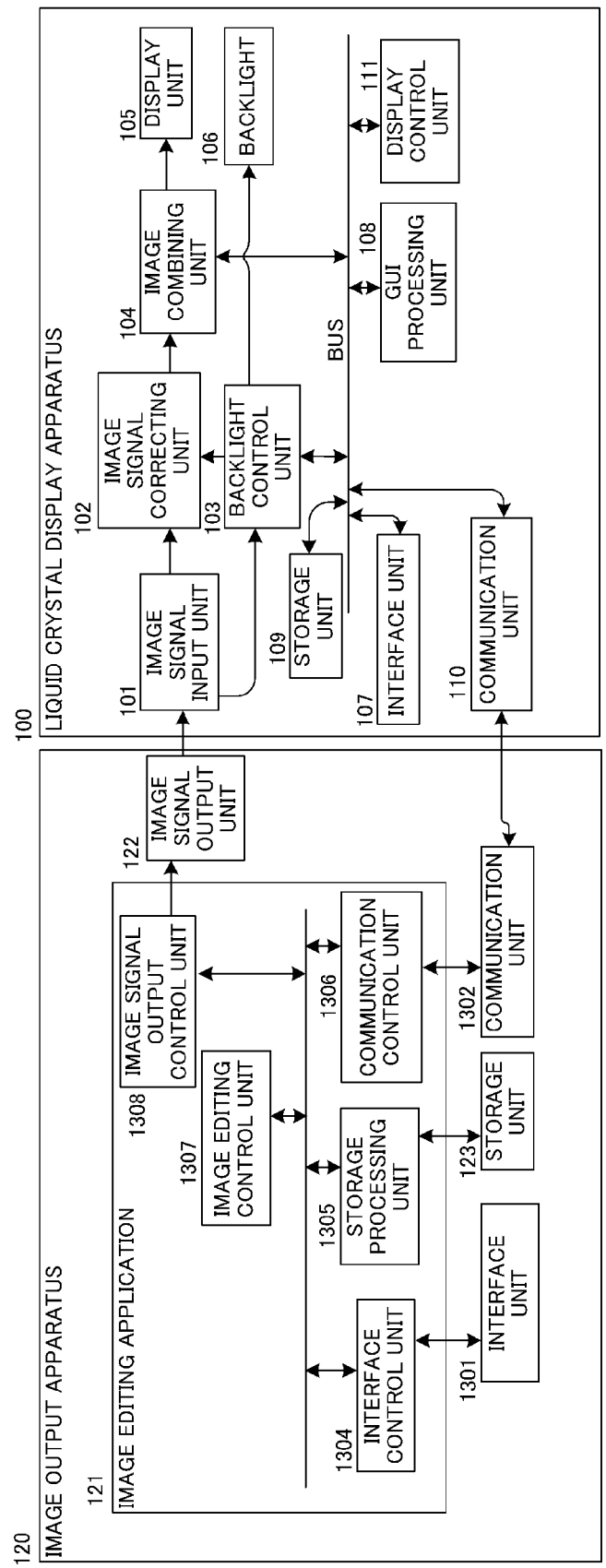
FIG. 7 shows a block diagram illustrating a system configuration in a second embodiment.

An explanation will be made with reference to FIG. 7 about a liquid crystal display apparatus and an image display system according to a second embodiment of the present invention. In this embodiment, a boundary image is displayed when a user performs the image editing by means of the image editing application. It is noted that any process block and any process flow, which are not specifically explained in relation to the liquid crystal display apparatus 100, are the same as or equivalent to those of the first embodiment.

A image output apparatus 120 has an image editing application 121 which enables the user to perform the editing operation with respect to the image data. The image editing application has an interface control unit 1304, a storage processing unit 1305, a communication control unit 1306, an image editing control unit 1307, and an image signal output control unit 1308. The storage processing unit 1305 controls the storage unit 123. The image signal output control unit 1308 controls the image signal output unit 122.

The user inputs a request of, for example, the image editing by operating the interface unit 1301 (for example, a mouse and a keyboard) of the image output apparatus 120. The image editing application 121 receives the operation request from the user by the aid of the interface control unit 1304.

If it is detected that the image editing operation (for example, any change of the display position of the image) is performed by the user, the image editing control unit 1307 generates a boundary image display request command. The generated boundary image display request command is transmitted by the image editing control unit 1307 via the communication control unit 1306 and a communication unit 1302 to the liquid crystal display apparatus 100. A communication unit 110 of the liquid crystal display apparatus 100 receives the boundary image display request command outputted from the image output apparatus 120. The boundary image display process, which is to be performed by the liquid crystal display apparatus 100 thereafter, is the same as or equivalent to that performed in the first embodiment. This embodiment is illustrative of an exemplary case of the operation for changing the display position of the image as the image editing operation performed by the user. However, it is unnecessary to limit the present invention thereto. It is also allowable that the boundary image display process is performed when the image editing operation, which includes, for example, the trimming, the enlargement, and the contraction, is performed.

Figure 8:
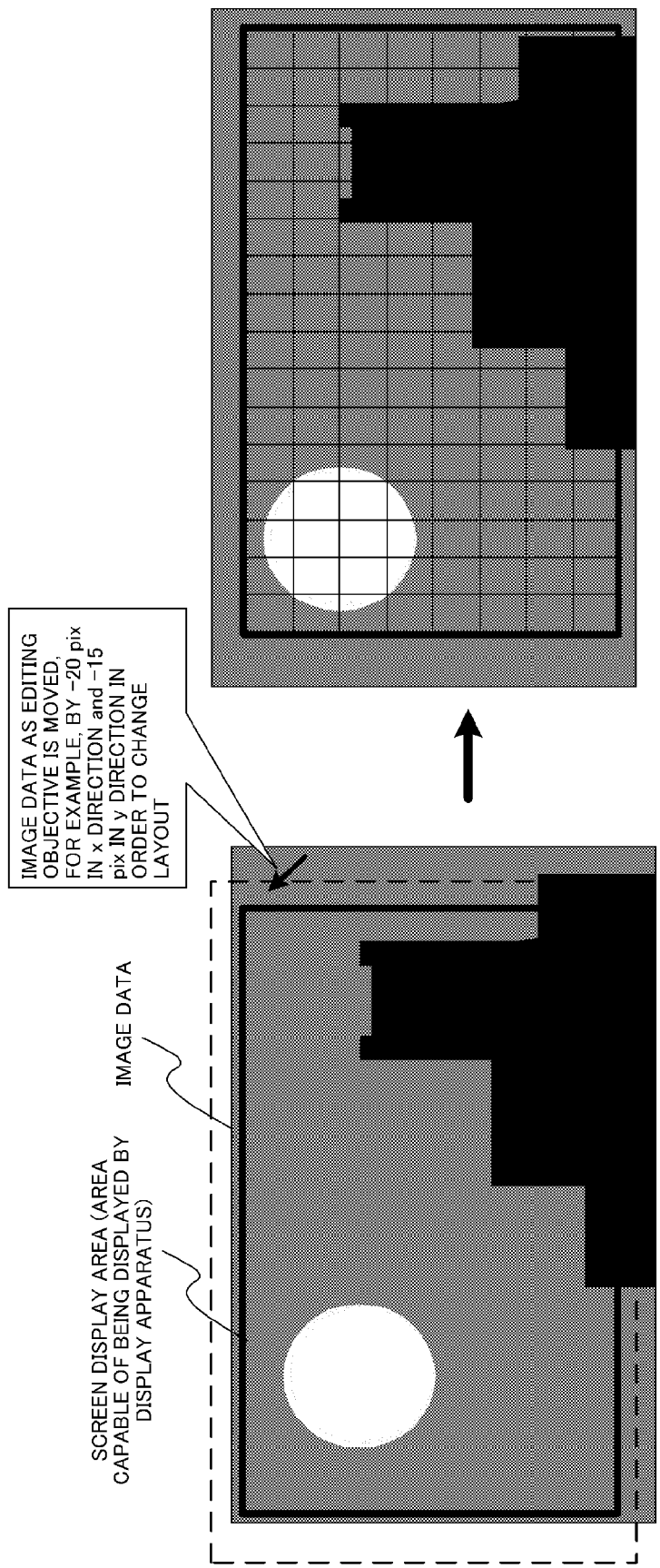
FIG. 8 illustrates the display of a boundary image in the second embodiment.

According to the process as described above, the display process is executed for the boundary image when the image editing operation, which includes, for example, the change of the display position of the image data, is performed by the user. As a result of the boundary image display process, the boundary image, which is generated by the GUI processing unit 108, is superimposed on the image of the editing screen of the image editing application 121 outputted from the image signal output unit 122, and the superimposed image is displayed on the display unit 105. FIG. 8 shows display states of the liquid crystal display apparatus 100 before the display process is executed for the boundary image and after the display process is executed for the boundary image in accordance with the image editing operation performed by the user. When the area, which is included in the image data and which can be displayed on the display unit, is moved as shown in FIG. 8A (the display position of the image is moved by −20 pix in the x direction and −15 pix in the y direction in an example shown in FIG. 8), the boundary image is displayed in the area which is displayed on the display apparatus after the movement.

In the second embodiment, the image editing application 121 of the image output apparatus 120 may acquire the backlight information from the liquid crystal display apparatus 100 to generate the boundary image. In this procedure, the image signal, on which the boundary image is superimposed, is outputted from the image signal output unit 122, which is displayed on the liquid crystal display apparatus 100.

Third Embodiment

Figure 9:
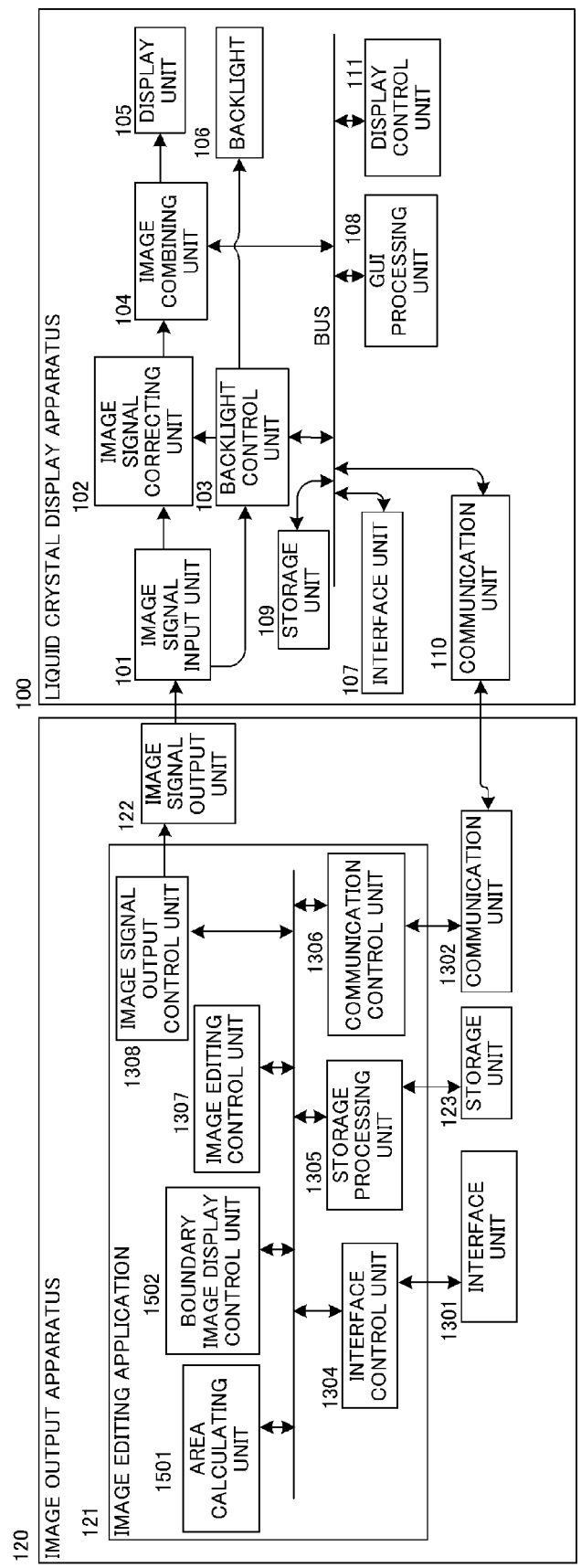
FIG. 9 shows a block diagram illustrating system configurations in third and fourth embodiments.

An explanation will be made with reference to FIGS. 9 and 10 about a process wherein a boundary image, which corresponds to an area designated by a user, is displayed on the liquid crystal display apparatus 100 by means of an image editing application according to a third embodiment of the present invention. It is noted that any process block and any process flow, which are not specifically explained in relation to the liquid crystal display apparatus 100, are the same as or equivalent to those of the first embodiment.

A image output apparatus 120 has an image editing application 121 which enables the user to perform the editing operation with respect to the image data. The image editing application has an interface control unit 1304, a storage processing unit 1305, a communication control unit 1306, an area calculating unit 1501, a boundary image display control unit 1502, and an image signal output control unit 1308. The storage processing unit 1305 controls the storage unit 123. The image signal output control unit 1308 controls the image signal output unit 122. An image editing control unit 1307 is a block irrelevant to this embodiment.

An explanation will be made below on the basis of FIG. 10A about a process for calculating and storing the coordinate information of a user-designated area.

The user inputs a request of, for example, the designation of a specified area in the image by operating the interface unit 1301 (for example, a mouse and a keyboard) of the image output apparatus 120. The image editing application 121 receives the operation request for the area designation from the user by the aid of the interface control unit 1304.

In Step S1601, the area calculating unit 1501 acquires the information of the user-designated area. The user-designated area is a specified area which is designated by the operation of the user and in which the displaying image data exists. The user-designated area can have any arbitrary shape.

In Step S1602, the area calculating unit 1501 calculates the coordinates of the specified area. The specified area is a minimum rectangular area which includes or embraces the user-designated area acquired as described above.

In Step S1603, the area calculating unit 1501 stores the coordinate information of the specified area in the storage unit 123 via the storage processing unit 1305.

An explanation will be made below on the basis of FIG. 10B about such a process that the coordinate information of the specified area is outputted from the image output apparatus 120 together with the boundary image display request command.

In Step S1701, the boundary image display control unit 1502 acquires the coordinate information of the specified area from the storage unit 123 when the display of the boundary image is requested by the operation of the user.

In Step S1702, the boundary image display control unit 1502 generates the boundary image display request command data. The coordinate information of the specified area is included in the boundary image display request command data.

In Step S1703, the boundary image display control unit 1502 outputs the boundary image display request command data to the liquid crystal display apparatus 100 via the communication control unit 1306 and the communication unit 1302.

An explanation will be made below on the basis of FIG. 10C about such a process that the boundary image display request command is received to calculate a range of the light source blocks as the display objective and a boundary image included in the calculated range is displayed.

In Step S1801, the backlight control unit 103 acquires the boundary image display request command data outputted from the image output apparatus 120 via the communication unit 110 to perform the area information input thereby. The area designation information is the coordinate information of the specified area.

In Step S1802, the backlight control unit 103 calculates a set of the light source blocks which includes the specified area, on the basis of the coordinate information of the specified area included in the boundary image display request command data acquired as described above. The set of the light source blocks which includes the specified area is such a set of the light source blocks that the entire area, which corresponds to the light source blocks included in the set, includes the specified area.

In Step S1803, the backlight control unit 103 transmits, to the GUI processing unit 108, the boundary image display request limited to the light source blocks included within the calculated range, together with the information of the range of the light source blocks calculated as described above. The GUI processing unit 108 performs the display process for the boundary image on the basis of the received information of the range of the light source blocks.

Figure 11B:
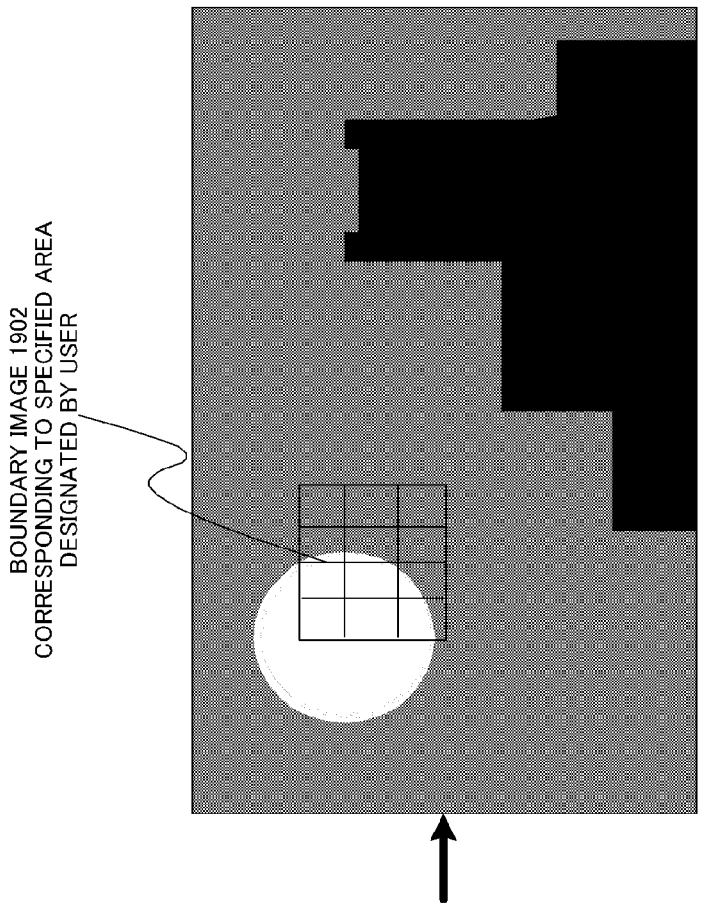
FIG. 11 shows an exemplary display of the specified area in the third embodiment.
Figure 11A:
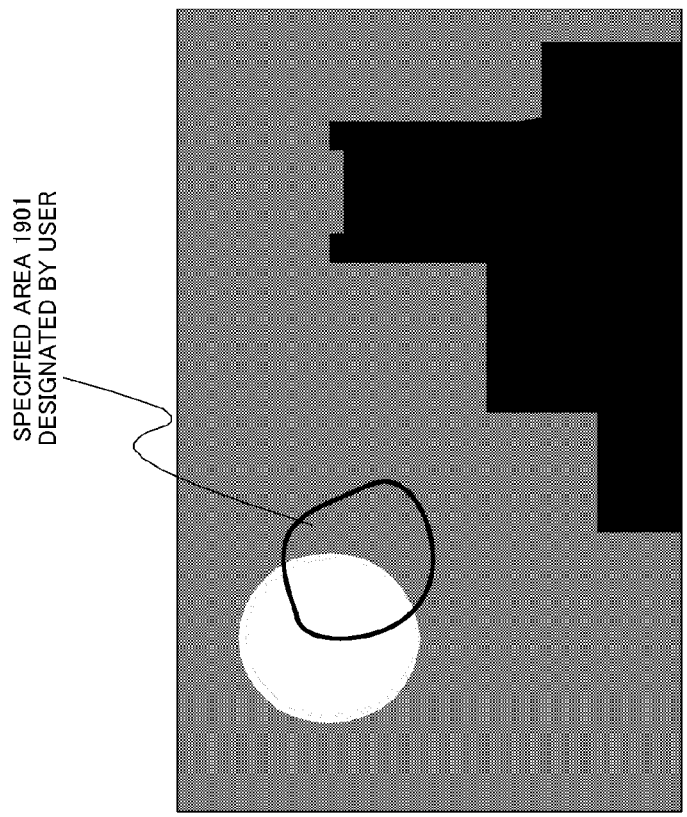

FIG. 11 shows a state of the liquid crystal display apparatus after executing the display process for the light source blocks corresponding to the specified area designated by the user according to the process as described above. The area 1901, which is designated by the user, is depicted by a solid line in FIG. 11A. When the display request for the boundary image is made in this state, the boundary image 1902, which indicates the light source blocks within the range including the area designated by the user, is displayed as shown in FIG. 11B.

Fourth Embodiment

An explanation will be made with reference to FIGS. 9 and 12 about a method for storing the information of the light source blocks when the local dimming control mode is changed according to a fourth embodiment of the present invention and a method for storing the information of the displayed boundary image as related to the image data of the image editing objective.

An explanation will be made below about the method for storing the information of the light source blocks when the local dimming control mode is changed.

The backlight control unit 103 of the liquid crystal display apparatus 100 stores the light source block information in the storage unit 109 as the local dimming control mode is changed. The change of the local dimming control mode represents the switching between the block unit control mode in which the light emission luminance is controlled for each of the light source blocks and the set unit control mode in which the light emission luminance is controlled for each of the light source block sets obtained by combining a plurality of the light source blocks as shown in FIG. 12. The light source block information is the information which relates to the construction or configuration of the light source blocks used in the local dimming control mode.

Figure 12:
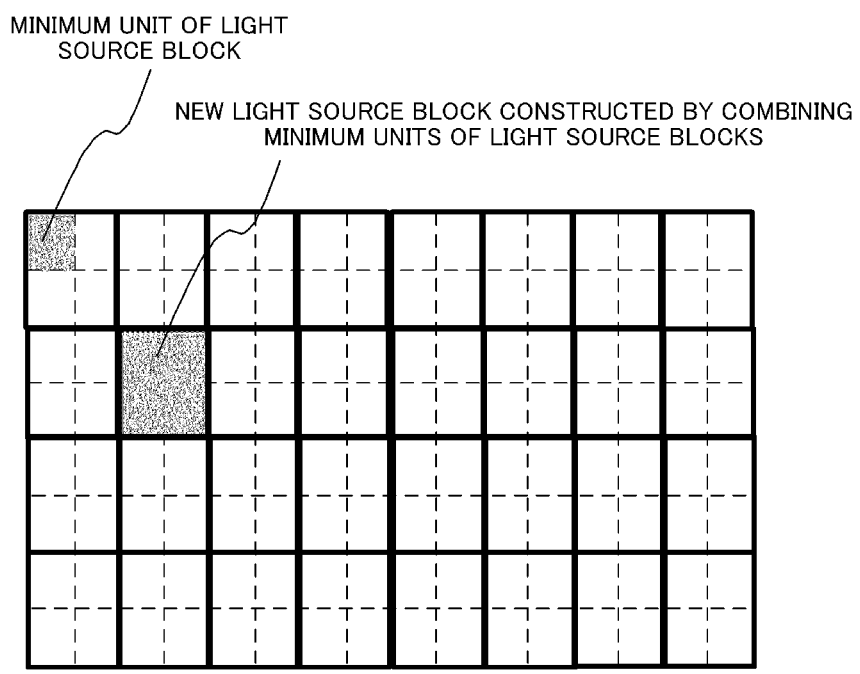
FIG. 12 shows an exemplary change of the local dimming control mode in the fourth embodiment.

In an example shown in FIG. 12, new one light source block is constructed by combining four minimum units of light source blocks in total in which two are provided in the vertical direction and two are provided in the lateral direction. In this local dimming control mode, the backlight 106 is divided into thirty-two light source blocks in total in which the backlight 106 is divided into four in the vertical direction and the backlight 106 is divided into eight in the lateral direction. The light emission luminance is controlled for each of the light source blocks. The method for displaying the boundary image in each of the local dimming control modes is the same as or equivalent to that of the first embodiment. In other words, in the case of the local dimming control mode in which the backlight 106 is divided into 32 as described above, the boundary image is an image indicated by thick line grids shown in FIG. 12. In FIG. 12, broken line grids indicate the boundary image provided in the local dimming control mode in which the backlight 106 is divided into 128 as explained in the first embodiment. In FIG. 12, the boundary images, which are provided in both of the local dimming control modes of the 32 division and the 128 division, are drawn. However, this drawing is provided for the convenience of explanation. Actually, only the boundary image corresponding to the local dimming control mode is displayed.

An explanation will be made below about the method for storing the displayed light source block information as related to the image data of the image editing objective.

The image editing control unit 1307 of the image editing application 121 receives a request of the user for storing the display image data via the interface unit 1301 and the interface control unit 1304. The image editing control unit 1307 transmits the request for acquiring the light source block information to the liquid crystal display apparatus 100 via the communication control unit 1306 and the communication unit 1302. The backlight control unit 103 of the liquid crystal display apparatus 100 acquires the request for acquiring the light source block information from the image output apparatus 120 via the communication unit 110. The backlight control unit 103 acquires the light source block information from the storage unit 109, and the present light source block information is noticed to the image output apparatus 120 via the communication unit 110. The image editing control unit 1307 of the image output apparatus 120 receives the light source block information outputted from the liquid crystal display apparatus 100. The received light source block information and the image data intended to be stored by the user are stored in a related manner by the image editing control unit 1307 in the storage unit 123 via the storage processing unit 1305.

According to the process as described above, it is possible to store the image editing display state when the user performs the image editing while performing the display of the boundary image in a certain local dimming control mode. Owing to this fact, when the user performs the image editing operation again, the user can reproduce the previous state to perform the image editing.

The respective embodiments described above are illustrative of the exemplary cases in which the grid-shaped image as shown in FIG. 5C is displayed as the light source block information. However, the light source block information to be displayed is not limited thereto provided that the relevant information is indicated so that a user can recognize the positions and the boundaries of the light source blocks used in the local dimming control. For example, it is also allowable to display a boundary image including the coordinate information of the area on the liquid crystal panel corresponding to the light source block in which the position designated by the user is included. In other words, the grid image shown in FIG. 5C visually shows the information of the positions and the boundaries of the light source blocks. However, in an example explained in this section, the information of the positions and the boundaries of the light source blocks is indicated by numerical values.

In this case, the boundary image display control unit 1502, which is included in the image editing application 121, receives the coordinate information of the point designated by the user via the interface unit 1301 and the interface control unit 1304. The boundary image display control unit 1502 transmits, to the liquid crystal display apparatus 100, a request for displaying the light source block information together with the coordinate information of the point designated by the user received as described above. The backlight control unit 103 of the liquid crystal display apparatus 100 performs the position information input by acquiring the request for displaying the light source block information and the coordinate information of the point designated by the user via the communication unit 110. The position designation information is the information which designates any arbitrary position on the liquid crystal panel. The backlight control unit 103 calculates the coordinate information of the light source block in which the acquired coordinate information of the point is included. The backlight control unit 103 transmits the calculated coordinate information of the light source block to the GUI processing unit 108. The GUI processing unit 108 generates a light source block coordinate information display screen from the coordinate information of the light source block acquired from the backlight control unit 103, and the display screen is displayed. The light source block coordinate information display screen can be exemplified by an image of a window including a text to indicate the respective values of the coordinates (x, y, w, h). It is also allowable that the user can arbitrarily set, for example, the display position, the size, and the transparency of the window.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-101488, filed on Apr. 28, 2011, which is hereby incorporated by reference herein in its entirety.

What is claimed is:

1. An image display apparatus comprising:
a display panel;
a light emitting unit which has a plurality of light source blocks and brightness of which is controlled for each of the light source blocks;
a generating unit which generates a boundary image which indicates a boundary around each of the light source blocks;
a first input unit which inputs setting of at least one of a color, a transmittance, and a line thickness of a boundary line in the boundary image; and
a display control unit which displays at least the boundary image on the display panel on the basis of the setting input by the first input unit.

2. The image display apparatus according to claim 1, wherein the display control unit displays an image generated by combining an image based on an input image data and the boundary image on the display panel.

3. The image display apparatus according to claim 1, further comprising:
a second input unit which inputs information to designate an arbitrary area on the display panel, wherein
the boundary image generated by the generating unit is an image which indicates boundaries of light source blocks included in a set of the light source blocks which meets a condition, the set consisting of light source blocks which embrace the designated area in entirety thereof.

4. The image display apparatus according to claim 3, wherein, when a plurality of sets meets the condition, the boundary image generated by the generating unit is an image which indicates boundaries of light source blocks included in the set which has a minimum number of the light source blocks among the plurality of sets.

5. The image display apparatus according to claim 1, wherein the generating unit generates data which includes the boundary image and coordinate information of the light source block.

6. The image display apparatus according to claim 5, further comprising:
a third input unit which inputs information to designate an arbitrary position on the display panel, wherein
the data includes coordinate information of the light source block which includes the position designated by the information input by the third input unit.

7. The image display apparatus according to claim 1, further comprising:
a fourth input unit which inputs an instruction to display the boundary image on the display panel, wherein:

the display control unit displays the boundary image on the display panel when the instruction is input by the fourth input unit.

8. The image display apparatus according to claim 1, further comprising:
a light emission control unit which controls the light emitting unit in accordance with a first control in which the brightness is controlled for each of the light source blocks or a second control in which the plurality of light source blocks are subjected to light emission at an identical brightness, wherein:
the display control unit displays the boundary image on the display panel when the first control is performed.

9. The image display apparatus according to claim 8, wherein:
the light emission control unit performs, as the first control, a third control in which the brightness is controlled for each of the light source blocks or a fourth control in which the brightness is controlled for each of light source block groups, each of which is a combination of a plurality of the light source blocks; and
the generating unit generates the boundary image which indicates boundaries of the light source block groups on the display panel when the fourth control is performed.

10. An image display system comprising the image display apparatus as defined in claim 3 and an image output apparatus which outputs image data to the image display apparatus, the image output apparatus comprising:
an input unit which inputs a user operation to designate an arbitrary area on the display panel; and
a transmitting unit which transmits information of the area designated by the user operation to the image display apparatus, wherein
the second input unit of the image display apparatus inputs the information transmitted from the transmitting unit of the image output apparatus.

11. An image display system comprising the image display apparatus as defined in claim 6 and an image output apparatus which outputs image data to the image display apparatus, the image output apparatus comprising:
an input unit which inputs a user to operation to designate an arbitrary position on the display panel; and
a transmitting unit which transmits information of the position designated by the user operation the image display apparatus, wherein
the third input unit of the image display apparatus inputs the information transmitted from the transmitting unit of the image output apparatus.

12. An image display system comprising the image display apparatus as defined in claim 7 and an image output apparatus which outputs image data to the image display apparatus, the image output apparatus comprising:
an input unit which inputs a user operation to edit an image; and
a transmitting unit which transmits an instruction to display the boundary image on the display panel to the image display apparatus when image editing is performed by the user operation, wherein
the fourth input unit of the image display apparatus inputs the instruction transmitted from the transmitting unit of the image output apparatus.

13. A method for controlling an image display apparatus comprising a display panel and a light emitting unit which has a plurality of light source blocks and brightness of which is controlled for each of the light source blocks, the method comprising:
a generating step of generating a boundary image which indicates a boundary of each of the light source blocks;
a first inputting step of inputting at least one of a color, a transmittance, and a line thickness of a boundary line in the boundary image; and
a display controlling step of displaying at least the boundary image on the display panel on the basis of the setting input in the first inputting step.

14. The method for controlling an image display apparatus according to claim 13, wherein, in the display controlling step, an image generated by combining an image based on an input image data and the boundary image is displayed on the display panel.

15. The method for controlling an image display apparatus according to claim 13, further comprising:
a second inputting step of inputting information to designate an arbitrary area on the display panel, wherein
the boundary image generated in the generating step is an image which indicates boundaries of light source blocks included in a set of the light source blocks which meets a condition, the set consisting of light source blocks which embrace the designated area in entirety thereof.

16. The method for controlling an image display apparatus according to claim 15, wherein, when a plurality of sets meets the condition, the boundary image generated in the generating step is an image which indicates boundaries of light source blocks included in the set which has a minimum number of the light source blocks among the plurality of sets.

17. The method for controlling an image display apparatus according to claim 13, wherein in the generating step, data which includes the boundary image and coordinate information of the light source block is generated.

18. The method for controlling an image display apparatus according to claim 17, further comprising:
a third inputting step of inputting information to designate an arbitrary position on the display panel, wherein
the data includes coordinate information of the light source block which includes the position designated by the information input in the third inputting step.

19. The method for controlling an image display apparatus according to claim 13, further comprising:
a fourth inputting step of inputting an instruction to display the boundary image on the display panel, wherein:
in the display controlling step, the boundary image is displayed on the display panel when the instruction is input in the fourth inputting step.

20. The method for controlling an image display apparatus according to claim 13, further comprising:
a light emission controlling step of controlling the light emitting unit in accordance with a first control in which the brightness is controlled for each of the light source blocks or a second control in which the plurality of light source blocks are subjected to light emission at an identical brightness, wherein:
in the display controlling step, the boundary image is displayed on the display panel when the first control is performed.

21. The method for controlling an image display apparatus according to claim 20, wherein:
in the light emission controlling step, as the first control, a third control in which the brightness is controlled for each of the light source blocks or a fourth control in which the brightness is controlled for each of light source block groups, each of which is a combination of a plurality of the light source blocks; and in the generating step, the boundary image is generated which indicates boundaries of the light source block groups on the display panel when the fourth control is performed.

22. The image display apparatus according to claim 1, wherein the each of the light source blocks is generated based on the hardware structure of the backlight.

* * * * *